Jan. 15, 1935.  J. MILLEN  1,988,209
POTENTIAL SUPPLY SYSTEM FOR THERMIONIC TUBES
Filed March 29, 1928
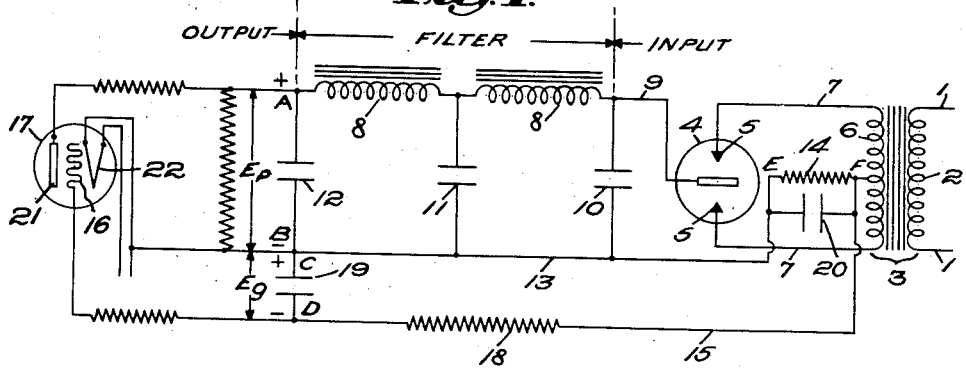
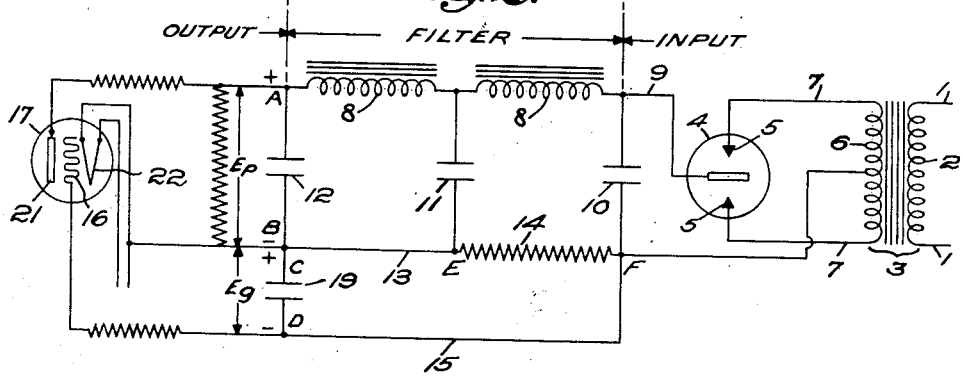
Inventor:
James Millen
by Emery, Booth, Janney & Varney
Attys Patented Jan. 15, 1935

1,988,209

UNITED STATES PATENT OFFICE 1,988,209

POTENTIAL SUPPLY SYSTEM FOR THERMIONIC TUBES

James Millen, Malden, Mass.

Application March 29, 1928, Serial No. 265,533

2 Claims. (Cl. 250—27)

My invention aims to provide improvements in the method and apparatus whereby grid and plate potentials may be supplied to thermionic tubes, and more particularly to the method of and means for obtaining grid biasing potentials.

In the drawing, which illustrates two embodiments of my invention:—

Figure 1 is a diagram showing a rectifier-filter system supplying grid and plate potentials to a thermionic tube, a resistor being provided in the input part of the system; and Fig. 2 is a diagram similar to that shown in Fig. 1, but with the resistor located in the filter part of the system.

Referring first to the embodiment of my invention illustrated by Figure 1, I have shown a rectifier-filter system for converting alternating current and supplying it to the grid and plate of a thermionic tube.

The circuit illustrated in Figure 1 is marked and lettered to aid in the description of the invention, the filter, input and output being clearly marked.

Lead wires 1—1 may be connected to any source of alternating current, as, for example, to 110 volts supplied at 60 cycles. These leads 1—1 are connected to the primary 2 of the transformer 3. Any type of rectifier may be used, but, for the purposes of illustration, I have shown a non-thermionic rectifier 4 of a well known type which has its anodes 5—5 connected to the secondary 6 of the transformer by means of the lead wires 7—7.

The filter means includes the usual reactors 8—8 in series with the positive lead wire 9 connected with the rectifier, and the capacitors 10, 11 and 12 respectively connected in multiple between the positive lead 9 and the negative or return lead wire 13. This lead wire 13 is connected through the resistor 14 to the secondary 6 of the transformer 3 at a point between the ends of the winding. I have found that reactors 8—8 of thirty (30) henries with capacitors 10 and 11 of two (2) microfarads and capacitor 12 of eight (8) microfarads provide a filter circuit of practicable use. However, these values may be varied to a large extent depending upon the use of the system.

In series with the lead wire 13, I have provided, between the capacitor 10 and the secondary 6 of the transformer 3, a resistor 14 so that it is located on the rectifier side of the system in the return lead.

The negative lead wire 15, which connects with the grid 16 of the thermionic tube 17, is tapped into the lead wire 13 between the secondary 6 of the transformer 3 and the resistor 14. A resistor 18 of about fifty thousand (50,000) ohms may be located in series with the lead wire 15 to aid in reducing the value of the by-pass capacitor 19. The capacity of this by-pass capacitor 19 may be about one microfarad.

In some instances, a capacitor 20 may be required to by-pass any small amount of alternating current ripple which might otherwise flow through the resistor 14.

With the above description in mind it will be readily understood that the plate potential Ep, as indicated in Figure 1, is supplied to the thermionic tube 17 in the usual manner. The positive lead wire 9 is connected to the plate 21 and the negative lead wire 13 is connected to the circuit which connects with the incandescent filament 22 of the tube 17. The grid biasing potential Eg is also supplied to the tube 17 in the usual manner. The positive is connected to the filament 22 and the negative (which is more negative than the negative of the plate potential, as will hereinafter appear) is connected to the grid 16, as above described.

I am aware that grid and plate potentials have been supplied to thermionic tubes of radio receivers by means of systems for converting alternating current. Such systems, as I have in mind, have generally split the available voltage at the output side of the filter to obtain the grid biasing potential. These systems have been generally unsatisfactory unless a large and costly by-pass condenser was used to decrease the alternating current shunt impedance of the grid potential supply to a very low order. Further difficulties with such systems is the tendency for the circuit receiving its power from such a source to oscillate at audio frequencies as a result of the common plate circuit coupling afforded by such an arrangement.

With my system, as above described in connection with Figure 1, I have provided the resistor 14 in the return lead 13 and on the rectifier side of the filter, rather than on the output side of the filter. This resistor does not in any way interfere with the normal and satisfactory operation of the system, nor does it introduce undesirable intertube coupling. In fact, .or the sake of circuit analogy, it may be considered as part of the inherent resistance of the secondary 6 of the transformer 3.

Because of the location of the resistor 14, there is no appreciable flow through it of the audio or radio frequency currents present in the plate circuits of any of the thermionic tubes supplied with plate potential from my system above described. There is, however, a definite direct current flow through the resistor 14, which results in a certain voltage across its terminals E and F. The terminal E is at the same potential as the terminal B—C, while the terminal F is more negative than the terminal E by an amount equal to the voltage drop across the resistor 14. Therefore, I employ the voltage drop across resistor 14 as a grid bias voltage for thermionic tubes.

As the grid of an amplifier tube draws no current when properly operated, the resistor 18, when used as illustrated in Figure 1, will force any alternating current in the grid circuit directly back to the filament 22 through the by-pass capacitor 19 and thus prevent its flow through the resistor 14. The use of the resistor 18 also reduces the necessary value of the by-pass capacitor.

Referring now to Fig. 2, I have illustrated a diagrammatic circuit of a system similar to that shown and described in connection with Figure 1. The same parts will bear the same reference characters so as to make the identity of the parts more simple than would be the case if different characters were used.

The only difference between the system shown in Figure 1 and that illustrated by Fig. 2 is in the location of the resistor 14 and the elimination of the capacitor 20 and the resistor 18.

In this instance the resistor 14 is located, in series with the lead wire 13, between the capacitors 10 and 11. The result of such a location of the resistor 14 is, that the amount of alternating current is so small as not to require by-passing by means of a shunt capacitor 20. The resistor 18 is omitted in Fig. 2, because it may or may not be used, as desired.

I wish to have it understood that my invention covers the location of the resistor 14 at any point in the system described so long as it is located on the rectifier side of the filter, or within the filter network itself. It should be further understood that the various values which I have given may be varied to a large extent without affecting my invention.

While I have illustrated and described two embodiments of my invention, I do not wish to be limited thereby, the scope of my invention being best defined in the following claims.

I claim:—

1. A rectifier-filter system for supplying grid and plate potentials to thermionic tubes including a rectifier means adapted to be connected to a source of alternating current, filter means connected to the rectifier means, a resistance located in the negative side of the system between the output side of the filter means and the rectifier means, a negative grid lead connected to the negative side of the system between said resistance and the source of current supply, a relatively small value by-pass capacitor located at the output end of the system between said negative side thereof and said grid lead, as and for the purposes illustrated and described, and a capacitor connected between said grid lead and the negative side of said system at a point between the input side of the filter and said resistance to by-pass any alternating current ripple which might otherwise flow through said resistance.

2. A rectifier-filter system for supplying grid and plate potentials to thermionic tubes including a rectifier means adapted to be connected to a source of alternating current, filter means connected to the rectifier means, a resistance located in the negative side of the system between the output side of the filter means and the rectifier means, a negative grid lead connected to the negative side of the system between said resistance and the source of current supply, a relatively small value by-pass capacitor located at the output end of the system between said negative side thereof and said grid lead as and for the purposes illustrated and described, a resistance located in series with said grid lead to aid in reducing the necessary value of said capacitor, and a capacitor connected between said grid lead and the negative side of said system at a point between the input side of the filter and said resistance to by-pass any alternating current ripple which might otherwise flow through said resistance.

JAMES MILLEN.